(12) United States Patent
Paweletz

(10) Patent No.: US 9,834,094 B2
(45) Date of Patent: Dec. 5, 2017

(54) METHOD AND DEVICE FOR DECOUPLING MASS FOR A MOTOR VEHICLE

(71) Applicant: Robert Bosch GmbH, Stuttgart (DE)

(72) Inventor: Anton Paweletz, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/105,716

(22) PCT Filed: Oct. 22, 2014

(86) PCT No.: PCT/EP2014/072611
§ 371 (c)(1),
(2) Date: Jun. 17, 2016

(87) PCT Pub. No.: WO2015/090683
PCT Pub. Date: Jun. 25, 2015

(65) Prior Publication Data
US 2016/0318399 A1    Nov. 3, 2016

(30) Foreign Application Priority Data

Dec. 19, 2013    (DE) ........................ 10 2013 226 771

(51) Int. Cl.
*B60L 3/00*     (2006.01)
*B60K 1/04*     (2006.01)
(Continued)

(52) U.S. Cl.
CPC .............. *B60L 3/0007* (2013.01); *B60K 1/04* (2013.01); *B60L 11/1879* (2013.01);
(Continued)

(58) Field of Classification Search
CPC ...... B60L 3/0007; B60L 11/1879; B60K 1/04; B60K 2001/0438; H01M 2/1083;
(Continued)

(56) References Cited

U.S. PATENT DOCUMENTS 5,249,026 A * 9/1993 Kojima .................. G03G 15/01
                                           399/112
6,158,538 A * 12/2000 Botzelmann ............. B60K 1/04
                                           180/65.1

(Continued)

FOREIGN PATENT DOCUMENTS

DE             3141164          4/1983
DE     102010050826 A1 * 5/2012          B60K 1/04

(Continued)

OTHER PUBLICATIONS

International Search Report for Application No. PCT/EP2014/072611 dated Mar. 10, 2015 (English Translation, 3 pages).

*Primary Examiner* — Darlene P Condra
(74) *Attorney, Agent, or Firm* — Michael Best & Friedrich LLP

(57) ABSTRACT

The invention relates to a mass-decoupling device for a motor vehicle, having: a mass-receiving element (10) and a mass object (11) accommodated therein, which mass-receiving element (10) and mass object (11) are point symmetrically formed and mounted opposite a body (36) of the motor vehicle; at least one guide means (13) that moveably mounts the mass-receiving element (10) and the mass object (11) accommodated therein along a longitudinal axis (L) of the vehicle; decoupling means (14) designed to decouple the mass-receiving element (10) and the mass object (11) accommodated therein from the body (36) of the motor vehicle; first energy-receiving means (15) designed to transmit kinetic energy of a movement of the mass-receiving element (10) and the mass object (11) accommodated therein to the body (36) of the motor vehicle in a predetermined time interval, said movement occurring along the longitudinal axis (L) of the vehicle, from a first position (P1) to a second position (P2); and second energy receiving means (16) designed to convert, at least partially, the kinetic energy of (Continued)

the movement of the mass-receiving element (10) and the mass object (11) accommodated therein along the longitudinal axis (L) of the vehicle into kinetic energy of a rotation of the mass object (11). The invention also relates to a corresponding method for decoupling mass for a motor vehicle.

9 Claims, 8 Drawing Sheets

(51) Int. Cl.
  *B60L 11/18* (2006.01)
  *F16F 15/31* (2006.01)
  *H01M 2/10* (2006.01)
  B62D 21/15 (2006.01)
  H01M 2/34 (2006.01)

(52) U.S. Cl.
  CPC .......... *F16F 15/31* (2013.01); *H01M 2/1083* (2013.01); *B60K 2001/0438* (2013.01); *B60Y 2306/01* (2013.01); *B62D 21/15* (2013.01); *F16F 2232/06* (2013.01); *H01M 2/347* (2013.01); *H01M 2220/20* (2013.01)

(58) Field of Classification Search
  CPC .. H01M 2220/20; H01M 2/347; B62D 21/15; B60Y 2306/01; F16F 2232/06; F16F 15/31
  See application file for complete search history.

(56) References Cited

U.S. PATENT DOCUMENTS

| | | | |
|---|---|---|---|
| 8,540,282 B2* | 9/2013 | Yoda | B60K 1/04 180/232 |
| 2011/0132676 A1* | 6/2011 | Kodaira | B60K 1/04 180/65.51 |
| 2015/0053492 A1 | 2/2015 | Kolatschek et al. | |
| 2015/0151624 A1* | 6/2015 | Yamada | B60K 1/04 180/68.5 |
| 2015/0231956 A1* | 8/2015 | Trentin | B60K 1/04 180/68.5 |
| 2017/0029034 A1* | 2/2017 | Faruque | B60K 1/04 |

FOREIGN PATENT DOCUMENTS

| | | | |
|---|---|---|---|
| DE | 102011105490 | | 12/2012 |
| DE | 102012204856 | | 10/2013 |
| JP | 0648185 | | 2/1994 |
| JP | 0692273 | | 4/1994 |
| JP | 2007118796 | | 5/2007 |
| JP | 2012086584 A | * | 5/2012 |
| WO | 2013143747 | | 10/2013 |

* cited by examiner

METHOD AND DEVICE FOR DECOUPLING MASS FOR A MOTOR VEHICLE

BACKGROUND OF THE INVENTION

The invention relates to a method and device for decoupling mass for a motor vehicle.

One of the most significant trends is the electrification of transportation, in particular of road vehicles. Vehicles are increasingly being driven by means of an electric motor or by means of a combination of an electric motor and an internal combustion engine. The electric energy required for this purpose is stored in an electrical energy store, which is installed on board the vehicle. Hence, the importance of electrical on-board technology is also increasingly an important prerequisite for this development. Growing demands with regard to safety technology involve the development of increasingly more complex crash constructions and systems. In the case of electric and so-called hybrid vehicles, the problem of the contribution of the vehicle battery to a crash balance as well as the safeguarding of the battery as a relatively expensive component additionally arises.

In this case, the electrically driven vehicles have the greatest importance. In order to achieve a large cruising range, said electrically driven vehicles are equipped with batteries which have a mass of several hundred kilograms. The proportion of the battery mass of the total mass in known electric vehicles typically amounts to 30% and thus comprises a disproportionally high percentage. In light of the fact that the energy density of batteries will not achieve the level of energy density of conventional fuels in the foreseeable future, the relatively high mass thereof is a safety factor. There is thus a growing need for protective devices and measures, by means of which the vehicle passengers, the battery and also the vehicle can be accordingly protected. The way in which the battery is mounted to the body of the motor vehicle is therefore of great importance. Known concepts for electrically driven vehicles intend for the battery to be a coherent rigid block having a center of mass set as deeply as possible in the region of the underbody of the vehicle between the front and rear axle. The battery together with the support structure thereof also influences the rigidity of the passenger compartment.

During a collision of the vehicle, the mass modules, i.e. passengers, luggage and battery are exposed to an impulse-like acceleration. The mass components active respectively at a certain point in time, the relative kinematics thereof and the energetic component of the total balance of the kinetic energy are decisive for the respective acceleration-time curve of a module.

The German patent DE 10 2012 204 856 A1 discloses a mass-coupling arrangement for a vehicle. By means of an elastic and controllable connection system between mass components of the vehicle, it is possible to actively influence the accelerations of mass units in a certain period of time during a vehicle collision. As a result, the effective loads on the passengers and on the battery are adjusted, i.e. not the entire vehicle mass but only a certain mass component in the defined period of time. For example, it is possible to temporarily mechanically decouple the battery including the support structure thereof from the vehicle. By exerting this influence, the battery mass passes through its own movement trajectory during a collision, and ultimately a more favorable temporal configuration of the partial crash pulses of the proportional masses and the loads working thereupon is achieved.

SUMMARY OF THE INVENTION

The present invention relates to a mass-decoupling device for a motor vehicle. The mass-decoupling device has a mass-receiving element and a mass object accommodated therein, which mass-receiving element and mass object are point symmetrically formed and mounted opposite a body of the motor vehicle. The mass-decoupling device furthermore has at least one guide means that movably mounts the mass-receiving element and the mass object accommodated therein along a longitudinal axis of the vehicle. In addition, the mass-decoupling device has decoupling means designed to decouple the mass-receiving element and the mass object accommodated therein from the body of the motor vehicle.

The mass-decoupling device furthermore has first energy receiving means designed to transmit kinetic energy of a movement of the mass-receiving element and the mass object accommodated therein to the body of the motor vehicle in a predetermined time interval, said movement occurring along the longitudinal axis of the vehicle, from a first position to a second position. In addition, the mass-decoupling device has second energy receiving means designed to convert, at least partially, the kinetic energy of the movement of the mass-receiving element and the mass object accommodated therein along the longitudinal axis of the vehicle into kinetic energy of a rotation of the mass object.

The present invention furthermore relates to a method for decoupling mass for a motor vehicle. The method comprises a decoupling of a mass-receiving element and a mass object accommodated therein, which mass-receiving element and mass object are point symmetrically formed and mounted opposite a body of the motor vehicle, from the body of the motor vehicle. The method furthermore comprises transmitting kinetic energy of a movement of the mass-receiving element and the mass object accommodated therein to the body of the motor vehicle in a predetermined time interval by means of first energy receiving means, said movement occurring along the longitudinal axis of the vehicle from a first position to a second position of the mass-receiving element and the mass object accommodated therein, wherein the mass-receiving element and the mass object accommodated therein are moveably mounted along a longitudinal axis of the vehicle by means of at least one guide means. The method furthermore comprises converting, at least partially, the kinetic energy of the movement of the mass-receiving element and the mass object accommodated therein along the longitudinal axis into kinetic energy of a rotation of the mass object by means of second energy receiving means.

As a result of decoupling the mass-receiving element and the mass object accommodated therein or respectively the vehicle battery, provision can be made for an adjustment of the time/position curve of the vehicle elements and the resulting accelerations thereof in the crash case and the proportional conversion of the kinetic energy of the mass object along the vehicle longitudinal axis into a kinetic energy of the rotation of the mass object.

A reduction in the crash energy is achieved by virtue of the fact that the kinetic energy of the movement of the mass object along the longitudinal axis of the vehicle is converted into the kinetic energy of the rotation of the mass object and therefore is not directly involved with the crash. The kinetic energy of the battery rotation thus stored can discharge after the crash without the mass object striking against the body of the motor vehicle. The mass-decoupling device can furthermore be adapted to respectively different vehicles. For example, the predetermined time interval can be varied in which the kinetic energy of the movement of the mass-receiving element and the mass object accommodated therein is transmitted by means of the first energy-receiving means to the body of the motor vehicle, said movement occurring along the longitudinal axis of the vehicle from the first position to the second position. In addition, a Coriolis force of the rotation of the mass object stabilizes a vehicle trajectory in the crash case and thus contributes to the vehicle safety.

Advantageous embodiments and modifications ensue from the dependent claims as well as from the description with reference to the figures.

Provision is preferably made for the first energy-receiving means to have at least one damping arrangement which is designed to dampen the movement of the mass-receiving element along the longitudinal axis of the vehicle, wherein the at least one damping arrangement has a first eddy-current actuator. By decoupling the mass-receiving element and the mass object accommodated therein from the body of the vehicle, the same can be temporarily decoupled from the body of the vehicle, which produces an improved crash behavior of the motor vehicle by means of a temporally offset energy reduction in the crash energy of the motor vehicle and the crash energy of the mass-receiving element and the mass object accommodated therein. The provision of the damping arrangement facilitates a recoupling of the mass-receiving element and the mass object accommodated therein in a predetermined time interval. The energy reduction in the crash energy of the mass-receiving element and the mass object accommodated therein can thus be varied by adjusting the damping degree of the damping arrangement.

Provision is furthermore preferably made for the mass object to have a driver in a peripheral region, said driver being designed in such a way that it interacts with the second energy-receiving means during a movement of the mass-receiving element and the mass object accommodated therein along the longitudinal axis of the vehicle such that the mass object can be set into rotation by means of the second energy-receiving means. As a result, the longitudinal movement of the mass-receiving element and the mass object accommodated therein can be advantageously transferred into the kinetic energy of the rotation of the mass object, wherein the rotation of the mass object can be discharged over an extended period of time after the vehicle crash.

According to a further preferred embodiment, provision is made for the second energy receiving means to have a rammer that is connected to a bumper in an articulated manner, said rammer interacting with the driver formed on the mass-receiving element in such a way that the mass-receiving element can be set into rotation when a movement of the mass-receiving element and the mass object accommodated therein occurs along the longitudinal axis of the vehicle, wherein the second energy receiving means comprise a return spring which connects a distal end of the rammer to the bumper, wherein the driver is engaged with the rammer in the first position of the mass-receiving element and wherein the second energy-receiving means are designed to return the rammer to a hollow space formed in the bumper after the mass-receiving element has been set into rotation.

The rammer is therefore designed to set the mass-receiving element and the mass object accommodated therein into rotation by bumping the driver when a movement of said mass-receiving element and said mass object accommodated therein occurs along the longitudinal axis of the vehicle. After said mass-receiving element and said mass object accommodated therein have been set into rotation, the rammer is returned to the hollow space formed in the bumper by the return spring, so that the driver does not come into contact with the rammer during rotation of said mass-receiving element and said mass object accommodated therein.

Provision is furthermore preferably made for the decoupling means to comprise at least one clamping device for coupling and/or decoupling the mass-receiving element to/from the body of the motor vehicle and at least one second eddy-current actuator, the at least one second eddy-current actuator being designed to operate the clamping device for coupling and/or decoupling the mass-receiving element to/from the body of the vehicle. The clamping device can thus be switched off in an advantageous manner by the eddy-current actuator, for example after a vehicle crash has been detected, whereby the mass-receiving element and the mass object accommodated therein are decoupled from the body of the motor vehicle.

According to a further preferred exemplary embodiment, provision is made for the clamping device for coupling and/or decoupling the mass-receiving element to/from the body of the motor vehicle to be disposed in a rotational axis of the mass-receiving element and the mass object accommodated therein. By means of the point symmetrical configuration of the mass-receiving element and the mass object as well as the mounting of the same opposite the body of the motor vehicle, the clamping device for coupling and/or decoupling the mass-receiving element to/from the body of the motor vehicle can likewise be disposed in an advantageous manner in the rotational axis of the mass-receiving element and the mass object accommodated therein and thus a simple and space-saving arrangement of the clamping device is achieved.

According to a further preferred embodiment, provision is made for a discharge of kinetic rotational energy of the mass-receiving element which was set in rotation and of the mass object accommodated therein to be able to be reduced by means of air friction and/or bearing friction of at least one bearing of the mass-receiving element. The kinetic rotational energy of the mass-receiving element set in rotation and of the mass object accommodated therein can thus be reduced in an uncontrolled manner over a period of time which is long in relation to the energy reduction by means of the first energy-receiving means. This results in a delayed energy reduction of the crash energy of the motor vehicle which is more advantageous in comparison to conventional devices.

According to a further preferred embodiment, provision is made for the discharge of kinetic rotational energy of the mass-receiving element set in rotation and of the mass object accommodated therein to be able to be reduced by means of a brake assembly for decelerating the mass-receiving element and the mass object accommodated therein. The kinetic rotational energy of the mass-receiving element set into rotation and of the mass object accommodated therein can thus be reduced in a controlled manner over a period of time that is relatively long in relation to the energy reduction by means of the first energy-receiving means. This results in a delayed energy reduction of the crash energy of the motor vehicle which is more advantageous in comparison to conventional devices.

According to a further preferred exemplary embodiment, provision is made for the brake assembly for decelerating the mass-receiving element and the mass object accommodated therein to comprise a pneumatic brake element and a plurality of mechanical brake elements. The pneumatic brake element is designed to interact with the plurality of mechanical brake elements by supplying an air flow into a channel formed between an outer peripheral section of the mass object and an inner peripheral section of a housing of the brake assembly such that the air flowing through the channel causes a deceleration pulse for decelerating the mass-receiving element and the mass object accommodated therein when said air is incident on the plurality of planarly configured mechanical brake elements. A spring force of a spring element is applied to each of the plurality of mechanical brake elements, which causes a mechanical deceleration of the mass element by means of frictional contact of the plurality of mechanical brake elements with an inner peripheral surface of the housing of the brake assembly when a spring force is applied which is larger than a centrifugal force generated by the rotation of the mass-receiving element and the mass object accommodated therein.

A controlled, fast discharge of the kinetic energy of the mass-receiving element and of the mass object accommodated therein can thus be achieved by combined pneumatic and mechanical braking. The control takes place automatically by the use of the centrifugal force as a control variable.

The embodiments and modifications described can be arbitrarily combined with one another.

Further possible embodiments, modifications and implementations of the invention also do not comprise explicitly stated combinations of features of the invention described previously or subsequently with respect to the exemplary embodiments.

BRIEF DESCRIPTION OF THE DRAWINGS

The attached drawings are to convey a further understanding of the embodiments of the invention. Said drawings illustrate embodiments and are used in combination with the description to explain principles and concepts of the invention.

Other embodiments and many of the stated advantages arise in view of the drawings. The depicted elements of the drawings are not necessarily shown true to scale with one another.

In the drawings:

FIG. 1 shows a schematic depiction of a mass-receiving element and a mass object accommodated therein according to a first embodiment of the invention;

FIG. 2 shows a schematic depiction of a mass-decoupling device installed in a motor vehicle according to the first embodiment of the invention;

FIG. 3 shows a top view of the mass-decoupling device for a motor vehicle according to the first embodiment of the invention;

FIG. 4 shows a cross-sectional view and an enlarged partial view of the mass-decoupling device shown in FIG. 3 according to the first embodiment of the invention;

FIG. 5 shows a cross-sectional view of the mass-decoupling device for a motor vehicle according to the first embodiment of the invention;

FIG. 6 shows an enlarged partial view of the cross-sectional view shown in FIG. 5 of the mass-decoupling device in the coupled state of a clamping device for coupling and/or decoupling the mass-receiving element to/from a body of the motor vehicle according to the first embodiment of the invention;

FIG. 7 shows an enlarged partial view of the cross-sectional depiction shown in FIG. 5 of the mass-decoupling device in the decoupled state of a clamping device for coupling and/or decoupling the mass-receiving element to/from a body of the motor vehicle according to the first embodiment of the invention;

FIG. 8 shows a top view of the mass-decoupling device for a motor vehicle according to a second embodiment of the invention;

FIG. 9 shows a cross-sectional view of the mass-decoupling device for a motor vehicle according to a third embodiment of the invention;

FIG. 10 shows a longitudinal cross-sectional view of the mass-decoupling device for a motor vehicle according to the third embodiment of the invention;

FIG. 11 shows a schematic depiction of a brake assembly for decelerating the mass-receiving element and the mass object accommodated therein according to the third embodiment of the invention;

Figure 12:
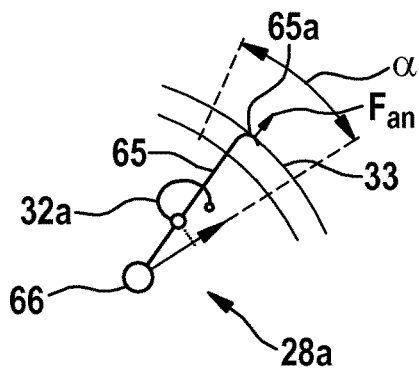
Figure 13:
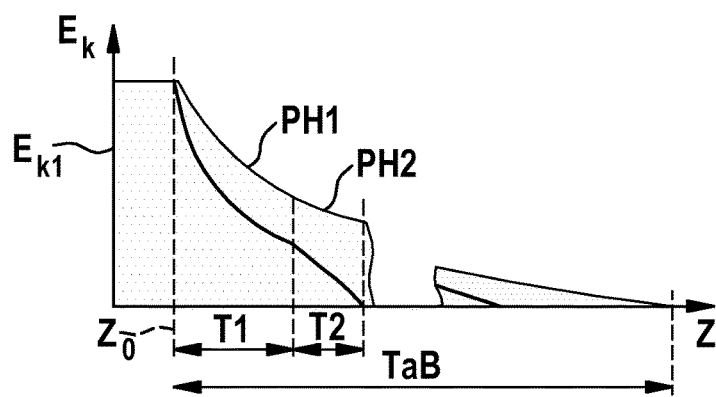
Figure 14:
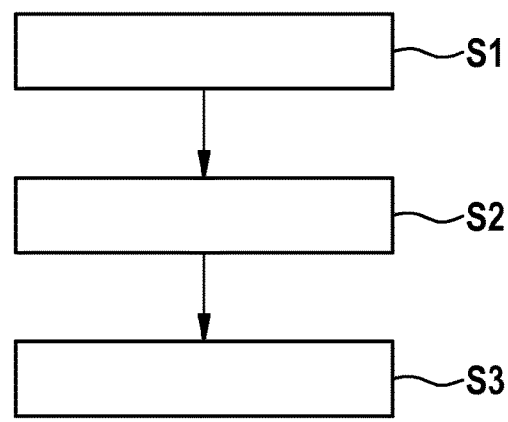
Figure 15:
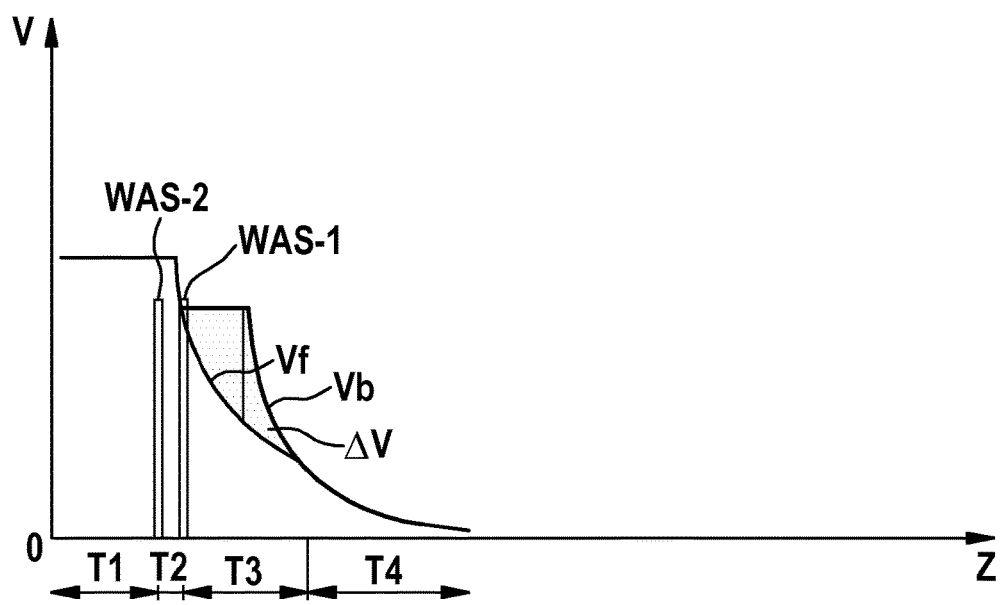
Figure 16:
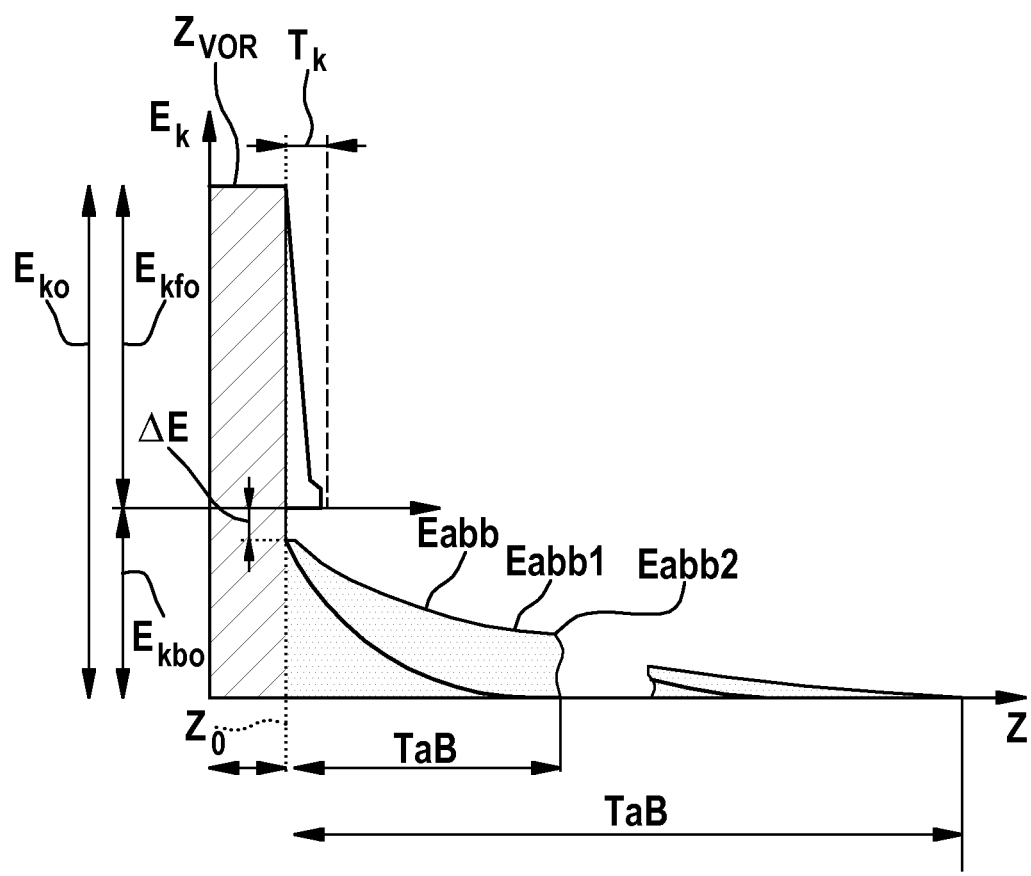

FIG. 12 shows a schematic depiction of a brake assembly for decelerating the mass-receiving element and the mass object accommodated therein according to the third embodiment of the invention;

FIG. 13 shows a temporal flow diagram of a reduction in the kinetic energy of a rotation of the mass-receiving element and the mass object accommodated therein according to the third embodiment of the invention;

FIG. 14 shows a flow diagram of the method for decoupling mass for a motor vehicle according to the first embodiment of the invention;

FIG. 15 shows a temporal flow diagram of a reduction in speed of the motor vehicle during a vehicle crash by means of the mass-decoupling device for a motor vehicle according to the first to the third embodiment of the invention; and FIG. 16 shows a temporal flow diagram of an energy reduction during a vehicle crash by means of the mass-decoupling device for a motor vehicle according to the first to the third embodiment of the invention.

In the figures of the drawings, identical reference signs denote identical or functionally identical elements, units or components unless otherwise specified.

DETAILED DESCRIPTION

Figure 1:
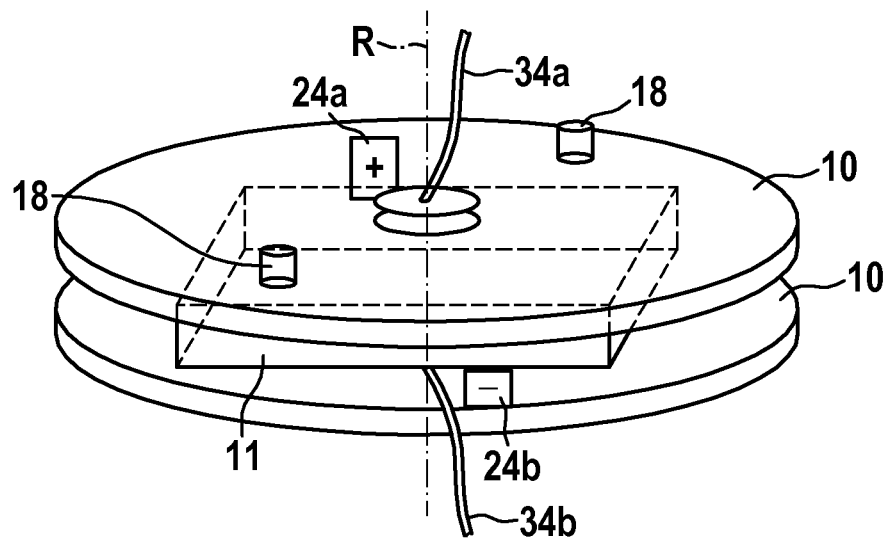

FIG. 1 shows a schematic depiction of a mass-receiving element and a mass object accommodated therein according to a first embodiment of the invention.

The mass-receiving element 10 is configured plate-shaped, comprising an upper and lower plate, wherein the upper and lower plate each have a cylindrical shape in the present embodiment. The mass object 11 is disposed between the upper and lower plate of the mass-receiving element 10. In the present embodiment, the mass object 11 is designed in the shape of a cube. The mass-receiving element 10 and the mass object 11 are point symmetrically formed and have a common axis of rotation R. In the present exemplary embodiment, the mass-receiving element 10 is a battery carrier and the mass object 11 is a vehicle battery for driving an electrically or at least partially electrically operated motor vehicle. On an outer peripheral region of the upper plate of the mass-receiving element 10, a driver 18 is disposed in each case at positions lying opposite one another on an upper side of the upper plate of the mass-receiving element.

The mass object 11 has a first disconnectable terminal 24a on an upper side and a second disconnectable terminal 24b on a lower side. A first flexible supply cable 34a, which contacts the mass object 11, is disposed on the upper side of the mass-receiving element. In addition, a second flexible supply cable 34b, which contacts the mass object 11, is disposed on the lower side of the mass-receiving element 10.

The first flexible supply cable 34a contacts a plus pole of the mass object or respectively the battery 11, and the second flexible supply cable 34b contacts a minus pole of the mass object 11.

The flexible supply cables 34a, 34b are used as electrical cables for supplying an electric drive of the motor vehicle with power. The mass-receiving element 10 and the mass object 11 are balanced and mounted opposite a body of the motor vehicle, which body is not shown in FIG. 1. The terminals 24a, 24b are situated on the axis of rotation R and can be switched off by respective actuators that are not shown in FIG. 1.

Figure 2:
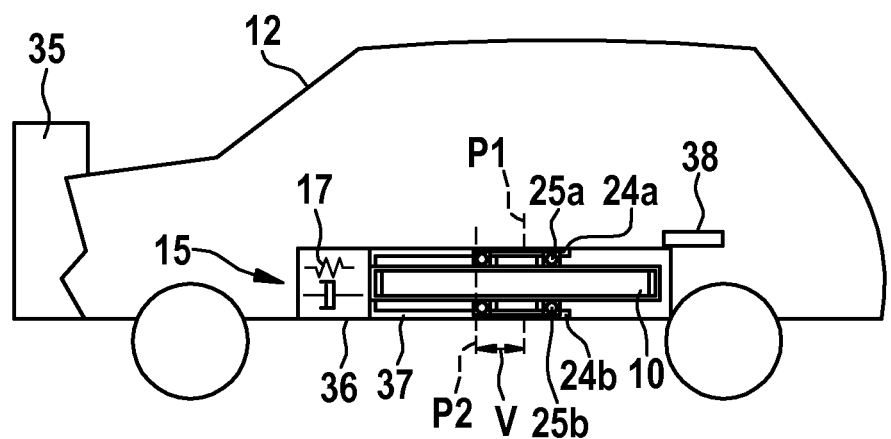

FIG. 2 shows a top view of the mass-decoupling device for a motor vehicle according to the first embodiment of the invention.

In FIG. 2, a collision of the motor vehicle, in particular of the body 12 of said motor vehicle, with an obstacle 35 is depicted. The mass-receiving element 10 and the mass object 11 accommodated therein are disposed in a crash chamber 36 of the mass object 11 and mounted by means of bearings 25a, 25b opposite the body 12 of the motor vehicle. The bearing 25a is disposed on the upper side of the mass-receiving element 10 and the bearing 25b is disposed on the lower side of the mass receiving element 10.

First energy-receiving means 15 are disposed in the longitudinal direction of the vehicle in front of the mass-receiving element 10. The first energy-receiving means 15 have a damping arrangement 17 in the present exemplary embodiment. The damping arrangement 17 is designed to dampen a movement of the mass-receiving element 10 and the mass object accommodated therein along the longitudinal axis of the vehicle. In the event of a vehicle collision, the mass-receiving element 10 and the mass object 11 accommodated therein can be decoupled from the body 12 of the motor vehicle by means of (decoupling means not shown in FIG. 2). The mass-receiving element 10 and the mass object 11 accommodated therein can be moved from a first position P1 to a second position P2 after being decoupled from the body 12 of the motor vehicle. In the present exemplary embodiment, the second position P2 is disposed in the longitudinal direction of the vehicle towards a front of the motor vehicle in front of the first position P1. In the event of decoupling the mass-receiving element 10 and the mass object 11 accommodated therein, said mass-receiving element and said mass object accommodated therein are movably arranged by means of a movable bearing flange 37, which is disposed between the respective bearings 25a, 25b of the mass-receiving element 10 and the crash chamber 36 and comprises a linear bearing.

A distance V between the first position P1 and the second position P2 of the mass-receiving element 10 shows a displacement of the axis of rotation of the mass-receiving element 10 after the crash. In addition, a control device 38 is provided for controlling the decoupling means, the first energy-receiving means as well as other components of the mass-decoupling device for the motor vehicle.

Figure 3:
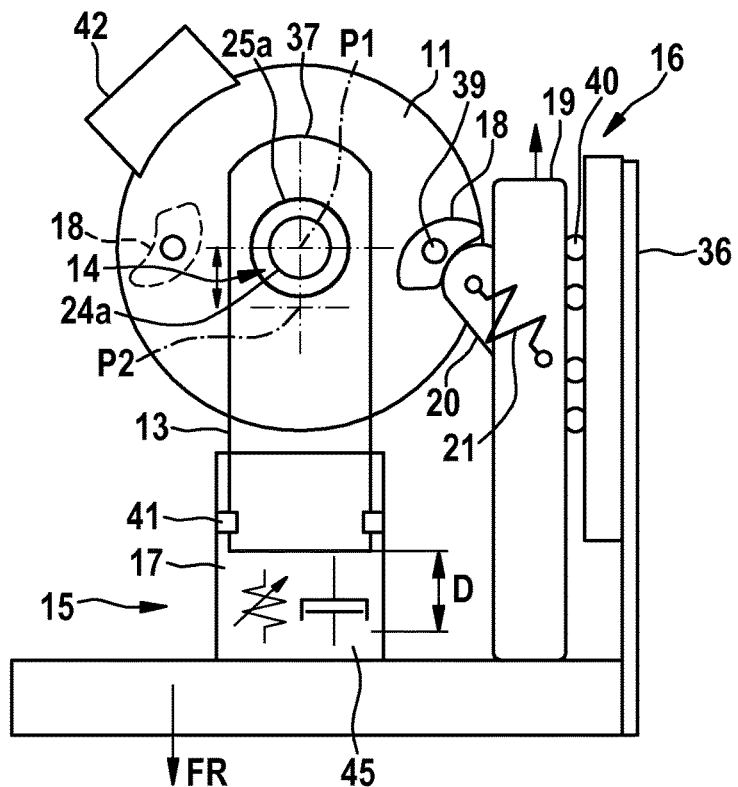

FIG. 3 show a top view of the mass-decoupling device for a motor vehicle according to the first embodiment of the invention.

The mass-decoupling device comprises the mass-receiving element 10 and the mass object 11 accommodated therein, which are point symmetrically formed and mounted opposite the body 12 of the motor vehicle. The mass-decoupling device furthermore comprises a guide means 13 that movably mounts the mass-receiving element 10 and the mass object 11 accommodated therein along the longitudinal axis of the vehicle. The guide means 13 is formed by the movable bearing flange 37 (shown in FIG. 2).

In addition, the mass-decoupling device comprises decoupling means 14 designed to decouple the mass-receiving element 10 and the mass object 11 accommodated therein from the body 12 of the motor vehicle. The decoupling means 14 have a clamping device (not shown in FIG. 3) for coupling and/or decoupling the mass-receiving element 10 to/from the body 12 of the motor vehicle. The decoupling means 14 furthermore have eddy-current actuators disposed respectively on the upper side and the lower side of the mass-receiving element 10 and designed to operate the clamping device for coupling and/or decoupling the mass-receiving element 10 from the body 12 of the motor vehicle.

The mass-decoupling device furthermore comprises the first energy-receiving means 15 designed to transmit kinetic energy of a movement of the mass-receiving element 10 and the mass object accommodated therein to the body 12 of the motor vehicle in a predetermined time interval, said movement occurring along he longitudinal axis of the vehicle from the first position P1 to the second position P2.

The clamping device 23 can be switched off by the two eddy-current actuators. In so doing, a possible arc is extinguished by means of a special device (not shown in FIG. 3) at the disconnectable terminals or respectively pole terminals. The damping arrangement 17 is switched over to soft by the eddy-current actuator 45 by means of a quick removal of a snap ring 41. As a result, the movement of the mass-receiving element 10 and the mass object 11 accommodated therein is made possible along the longitudinal axis of the vehicle from the first position P1 to the second position P2 in the predetermined time interval, whereby the kinetic energy of the movement of the mass-receiving element 10 can be transmitted to the body 12 of the motor vehicle.

Furthermore, the mass-decoupling device comprises second energy-receiving means 16 designed to convert, at least partially, the kinetic energy of the movement of the mass-receiving element 10 and the mass object 11 accommodated therein along the longitudinal axis of the vehicle L into kinetic energy of a rotation of the mass object 11. The second energy-receiving means 16 comprise a rammer that is connected in an articulated manner to a bumper 19, said rammer interacting with the driver 18 formed on the mass-receiving element 10 in such a way that the mass-receiving element 10 can be set into rotation by the rammer 20 when a movement of the mass-receiving element 10 and the mass object 11 accommodated therein occurs along the longitudinal axis of the vehicle. The second energy-receiving means 16 furthermore comprise a return spring 21 which connects a distal end of the rammer 20 to the bumper 19, wherein the driver 18 is engaged with the rammer 20 in the first position P1 of the mass-receiving element 10 and wherein the second energy-receiving means 16 are designed to return the rammer 20 to a hollow space 22 formed in the bumper 19 after the mass-receiving element 10 has been set into rotation.

When the mass-receiving element 10 and the mass object 11 accommodated therein move along the longitudinal axis L of the vehicle in the front direction FR of the motor vehicle, the rammer 20 bumps the driver 18 so that the mass-receiving element 10 and the mass object 11 accommodated therein are set into rotation in a counterclockwise direction in accordance with the present embodiment. A damping amplitude D in the region of the damping arrangement 17 of the mass-receiving element 10 corresponds to a distance between the first position P1 and the second position P2 of the mass-receiving element 10. The driver 10 is disposed in such a way that said driver in the first position P1 of the mass-receiving element 10 lies in an axis of rotation of the mass-receiving element 10 that is horizontal in the top view of said mass-receiving element 10, in particular such that a fastening or attachment point of the driver 18 to the mass-receiving element 10 lies in the previously mentioned axis of rotation of the mass-receiving element 10.

The second energy receiving means 16, in particular the bumper 19, is disposed by means of a linear bearing 40 on a side wall of the crash chamber of the mass-decoupling device. In the present embodiment, an auxiliary brake 42 for decelerating the mass-receiving element 10 that has been set into rotation is additionally disposed on an outer peripheral region of the mass-receiving element 10.

Figure 4:
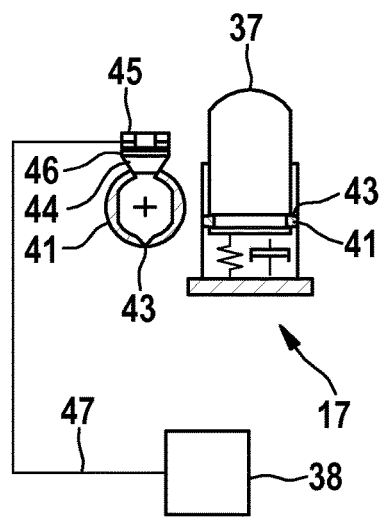

FIG. 4 shows a cross-sectional view and an enlarged partial view of the mass-decoupling device according to the first embodiment of the invention which is shown in FIG. 3.

The view shown in the left-hand region of FIG. 4 relates to a cross-sectional view of the clamping device 23 for coupling and/or decoupling the mass-receiving element 10 from the body 12 of the motor vehicle. The eddy-current actuator of the clamping device for coupling and/or decoupling the mass-receiving element 10 to/from the body 12 of the motor vehicle is shown in the left-hand region of FIG. 4. The eddy-current actuator has a movable copper disc 45 as well as an exciter coil disposed vertically thereunder.

A wedge-shaped member 44 is disposed beneath the exciter coil 46. The snap ring 41 is arranged around the mass-receiving element 10 and the mass object 11 accommodated therein. A tapered portion 43 is additionally provided in the lower region. The movable copper disc 45 of the eddy-current actuator is connected to the control device 38 via a supply cable 47 in order to actuate said eddy-current actuator.

In the right-hand region of FIG. 4, a longitudinal view of the mass-decoupling device is shown in the region of the damping arrangement 17. The movable bearing flange 37 is movably disposed along the longitudinal axis of the vehicle. The snap ring 41 is disposed in a recess in a housing of the damping arrangement 17.

Figure 5:
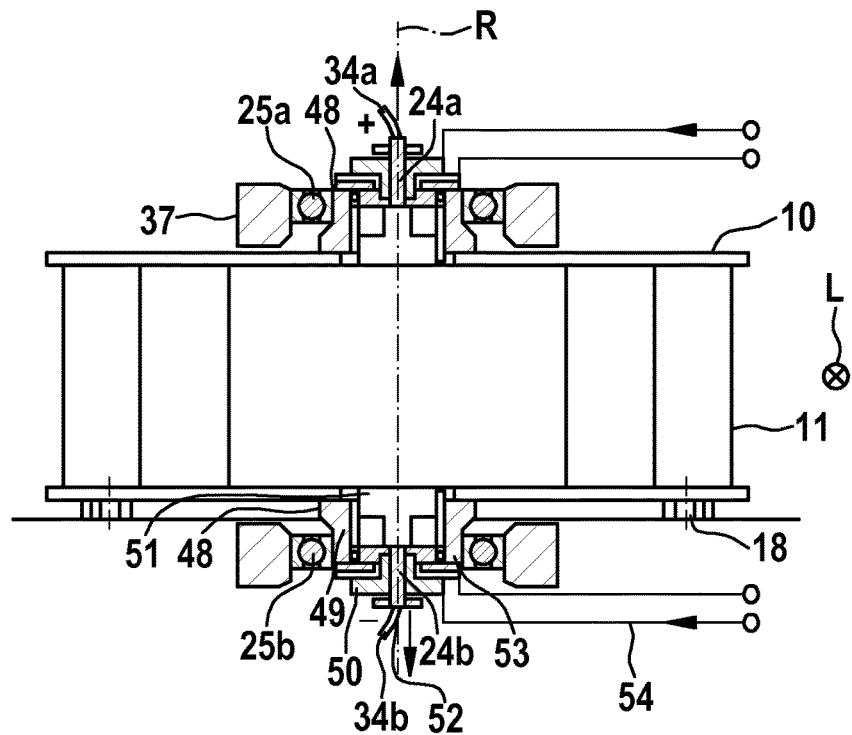

FIG. 5 shows a cross-sectional view of the mass-decoupling device for a motor vehicle according to the first embodiment of the invention.

The mass-decoupling device has a mass-receiving element 10 and the mass object 11 accommodated therein. The bearing 25a as well as the movable bearing flange 37 is disposed on the upper side of the mass-receiving element 10. The clamping device further comprises the disconnectable portion 24a of the terminal as well as a stationary portion 51. The flexible supply cable 34a is furthermore provided for connecting to the plus pole of the mass object 11.

The bearing 25b, the movable bearing flange 37 as well as the clamping device, which comprises a disconnectable portion 24b of the terminal as well as the stationary portion 51 of the terminal, are provided on the lower side of the mass-receiving element 10 as well as on the upper side of the mass-receiving element 10. A shaft 48 of the mass object 11 is furthermore provided, which is point symmetrically formed with the axis of rotation R of the mass-receiving element and has a substantially cylindrical shape.

The shaft 48 is furthermore disposed adjacent to an outer peripheral section of the stationary portion 51 of the clamping device and encloses the same. In addition, an insulating sleeve 49 is arranged on a distal section of the shaft 48 of the mass object 11 in relation to the mass-receiving element 10.

The clamping device furthermore comprises an annular spring 50, a snap type terminal separation ring 53 comprising an arc extinguishing device as well as a supply cable 54 for the eddy-current actuator 24b. The previously mentioned components of the clamping device are described in more detail with regard to FIG. 6 and FIG. 7.

Figure 6:
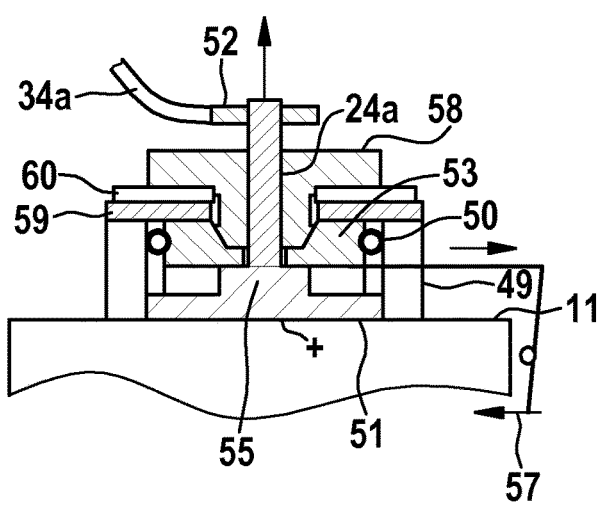

FIG. 6 shows an enlarged partial view of the cross-sectional depiction of the mass-decoupling device shown in FIG. 5 in the coupled state of a clamping device for coupling and/or decoupling the mass-receiving element to/from a body of the motor vehicle according to the first embodiment of the invention.

In FIG. 6, the clamping device, in particular the eddy-current actuator of the clamping device, is switched on. By passing current through the coil 59 of the eddy-current actuator, the mass object is clamped by the clamping device. The snap type terminal separation ring 53 comprising the arc extinguishing device is a multi-piece, point symmetrical closure, which is pressed together by means of the annular spring 50 and, in the coupled state of the clamping device, is separated or respectively pushed off by means of the disconnectable portion 24a of the terminal of the mass object 11.

Figure 7:
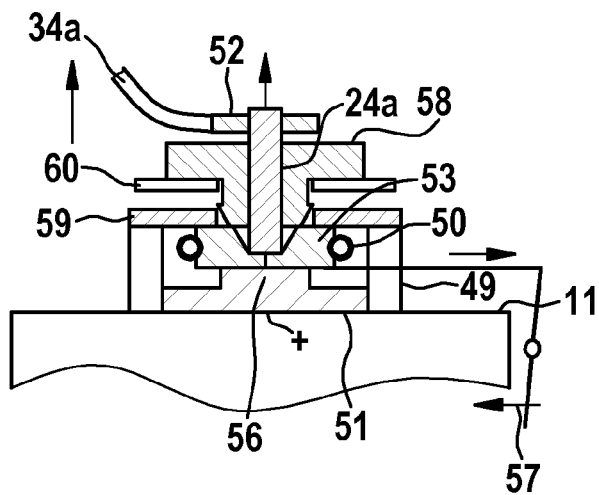

FIG. 7 shows an enlarged partial view of the cross-sectional depiction of the mass-decoupling device shown in FIG. 5 in the decoupled state of a clamping device for coupling and/or decoupling the mass-receiving element to/from a body of the motor vehicle according to the first embodiment of the invention.

In FIG. 7, current is not passed through the coil 59 of the eddy-current actuator. Thus, a decoupling of the mass-receiving element 10 and the mass object 11 accommodated therein from the body 12 of the motor vehicle results. The driver 58 is released and the snap type terminal separation ring 53 is pressed together by the annular spring 4 so that there is an insulation 56 between the respective terminal portions. Provision is furthermore made for a restoring mechanism 57 for resetting the snap type terminal separation ring 53.

Figure 8:
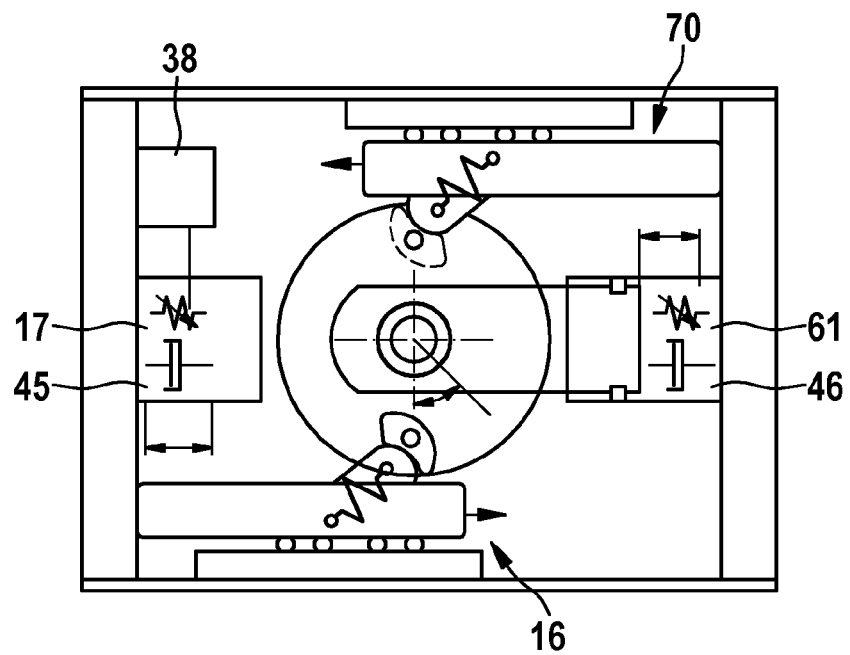

FIG. 8 shows a top view of the mass-decoupling device for a motor vehicle according to a second embodiment of the invention.

In FIG. 8, a second damping arrangement 61 according to a second embodiment is provided in addition to the first embodiment shown in FIG. 3. The second damping arrangement 61 is disposed opposite to the damping arrangement 17 at a position of the crash chamber which, in the longitudinal direction of the vehicle, is at the rear. Furthermore, additional energy-receiving means 16 are provided opposite to the second energy receiving means 16, said additional energy-receiving means having the same function as the energy-receiving means 16. The damping arrangement 61 and the energy-receiving means 70 enable a movement of the mass-receiving element 10 and the mass object 11 accommodated therein in the crash chamber along the longitudinal axis of the vehicle towards the rear of the motor vehicle. This is, for example, desirable in the event of a rear collision, in which acceleration forces on the mass-receiving element 10 act towards the rear of the vehicle.

Figure 9:
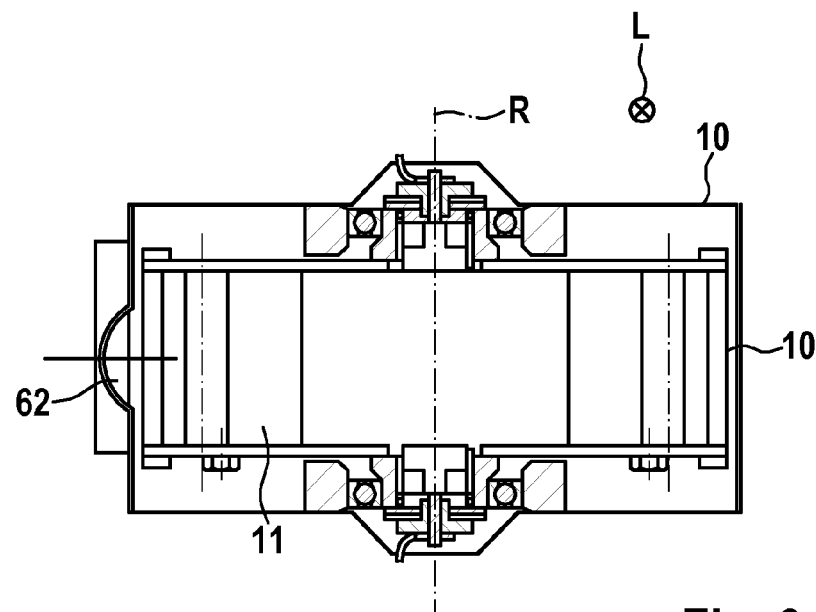

FIG. 9 shows a cross-sectional view of the mass-decoupling device for a motor vehicle according to a third embodiment of the invention.

In FIG. 9, a brake assembly is provided for decelerating the mass-receiving element 10 and the mass object 11 accommodated therein. A suction channel 62 is disposed in a peripheral region of the mass-receiving element 10. Said suction channel is described in greater detail with regard to FIG. 10.

Figure 10:
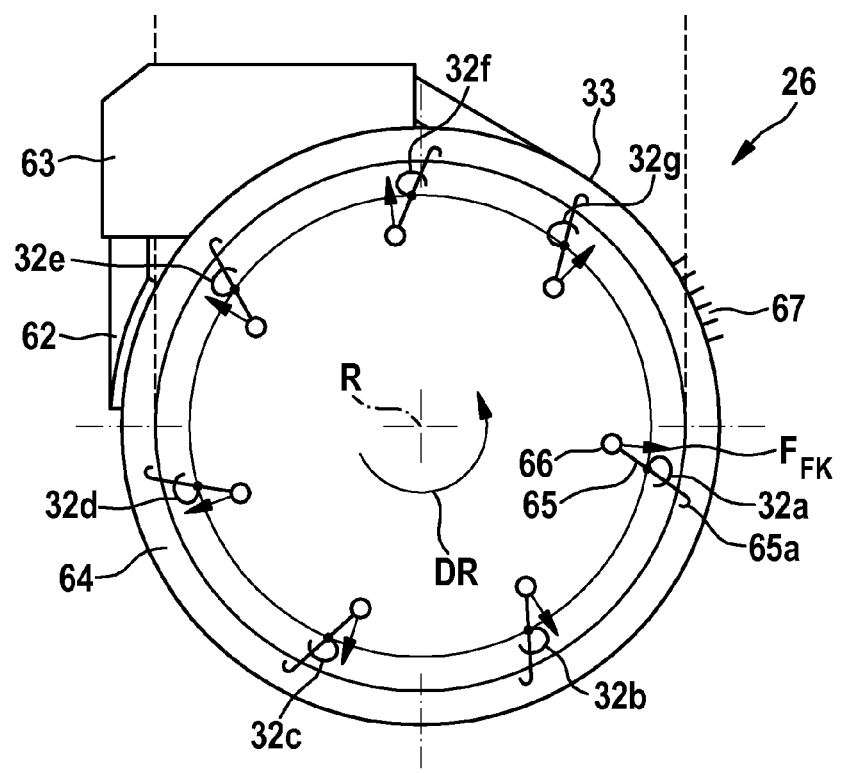

FIG. 10 shows a longitudinal view of the mass-decoupling device for a motor vehicle according to the third embodiment of the invention.

A brake assembly 26 for decelerating the mass-receiving element 10 and the mass object 11 accommodated therein has a pneumatic brake element 27 and a plurality of mechanical brake elements 28a, 28b, 28c, 28d, 28e, 28f, 28g.

The pneumatic brake element 27 is designed to interact with the plurality of mechanical brake elements 28a, 28b, 28c, 28d, 28e, 28f, 28g by supplying an air flow in a channel 31 formed between an outer peripheral section 29 of the mass object 11 and an inner peripheral section 33 of a housing of the brake assembly 26 such that the air flowing through the channel 31 causes a deceleration pulse for decelerating the mass-receiving element 10 and the mass object 11 accommodated therein when said air is incident on the planarly configured mechanical brake elements 28a, 28b, 28c, 28d, 28e, 28f, 28g.

Alternatively, provision can be made for the supply of pressurized gas, in particular compressed air, or another suitable gas, which has a cooling effect on the brake assembly 26 due, for example, to a low temperature.

A spring force $F_{FE}$ of a spring element 32a, 32b, 32c, 32d, 32e, 32f, 32g is applied to each of the plurality of mechanical brake elements 28a, 28b, 28c, 28d, 28e, 28f, 28g, which causes a mechanical deceleration of the mass element by means of frictional contact of the plurality of mechanical brake elements 28a, 28b, 28c, 28d, 28e, 28f, 28g with an inner peripheral surface 33 of the housing of the brake assembly 26 when a spring force $F_{FE}$ is applied which is larger than a centrifugal force $F_{FK}$ generated by the rotation of the mass-receiving element 10 and the mass object 11 accommodated therein.

Thus, the kinetic energy of the rotating mass-receiving element and the mass object accommodated therein is reduced in a controlled manner by means of combined pneumatic and mechanical braking.

Figure 11:
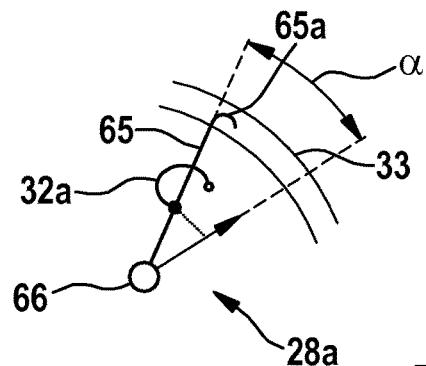

FIG. 11 show a schematic depiction of a brake assembly for decelerating the mass-receiving element and the mass object accommodated therein according to the third embodiment of the invention.

In FIG. 11, the brake element 65, for example of the mechanical brake element 28a, is shown in a position in which a friction element 65a of the brake element 25 does not make contact with the inner peripheral surface 33 of the housing of the brake assembly 26.

FIG. 12 shows a schematic depiction of a brake assembly for decelerating the mass-receiving element and the mass object accommodated therein according to the third embodiment of the invention.

In FIG. 12, the friction element 65a of the brake element 65 makes frictional contact with the inner peripheral surface 33 of the housing of the brake assembly 26. As a result, the brake assembly 26 mechanically decelerates the mass object 11. Due to the fact that the spring force of the coil spring 32a is greater than the centrifugal force $F_{FK}$ of the rotation of the mass object 11, the brake element 65 is moved at an angle a from a first position to a second position, in which the brake element 65 makes frictional contact with the inner peripheral surface 33 of the housing of the brake assembly 26 until the mass object 11 comes completely to rest as a result of the friction.

FIG. 13 shows a temporal flow diagram of a reduction in kinetic energy of a rotation of the mass-receiving element and the mass object accommodated therein according to the third embodiment of the invention.

An initial kinetic energy of the mass-receiving element 10 and the mass object 11 accommodated therein is depicted in the region $E_{K1}$. The period of time T1 begins at the point in time $Z_0$, in which period of time a rotational speed of the mass-receiving element and the mass object accommodated therein is carried out by means of pneumatic braking using the pneumatic brake element in the phase PH1. In the second period T2, which corresponds to the phase PH2, the centrifugal force, which acts on the mechanical brake elements 28a to 28g, is less than the spring force $F_{FE}$ acting by means of the spring elements on the mechanical brake elements, so that a mechanical braking by means of the mechanical brake elements occurs. A contact force of the mechanical brake elements 28a to 28g increases with increasing frictional force or respectively decreasing centrifugal force until the mass-receiving element and the mass object accommodated therein, which have been set into rotation, are completely stopped. The reference sign TaB denotes a total period of time required for decelerating the mass object 11.

FIG. 14 shows a flow diagram of the method for decoupling mass for a motor vehicle according to the first embodiment of the invention.

The method for decoupling mass for a motor vehicle comprises decoupling S1 a mass-receiving element 10 and a mass object 11 accommodated therein, which are point symmetrically formed and mounted opposite a body 12 of the motor vehicle, from the body 12 of the motor vehicle. The method further comprises transmitting S2 kinetic energy of a movement of the mass-receiving element 10 and the mass object 11 accommodated therein to the body 12 of the motor vehicle in a predetermined time interval by means of first energy-receiving means 15, said movement occurring along the longitudinal axis of the vehicle from a first position P1 to a second position P2 of the mass-receiving element 10 and the mass object 11 accommodated therein, wherein said mass-receiving element 10 and said mass object 11 accommodated therein are movably mounted along a longitudinal axis L of the vehicle by means of at least one guide means. The method furthermore comprises converting S3, at least partially, the kinetic energy of the movement of the mass-receiving element 10 and the mass object 11 accommodated therein along the longitudinal axis L of the vehicle into kinetic energy of a rotation of the mass object by means of second energy-receiving means.

FIG. 15 shows a temporal flow diagram of a reduction in speed of the motor vehicle during a vehicle crash by means of the mass-decoupling device for a motor vehicle according to the first to the third embodiment of the invention.

In FIG. 15, a vehicle speed is depicted as a function of a period of time. During the period of time T1, terminals are switched off by activating the eddy-current actuators 24a, 24b. During the period of time T2, the damping arrangement is switched over to soft by activating the eddy-current actuator 45. Furthermore, the snap ring is closed. During the period of time T3, the mass object again achieves the same linear speed as the body 12 of the motor vehicle. During the period of time T4, the vehicle is decelerated to rest. The reference sign $V_F$ denotes the vehicle speed; the reference sign $V_B$ denotes the linear speed of the mass-receiving element and the mass object accommodated therein; and the reference sign $\Delta V$ denotes a difference in the linear speeds between the vehicle and the mass object.

FIG. 16 shows a temporal flow diagram of an energy reduction during a vehicle crash by means of the mass-decoupling device for a motor vehicle according to the first to the third embodiment of the invention.

In FIG. 16, the reduction in the kinetic during the vehicle crash is depicted in a simplified manner. FIG. 16 shows a distribution of the kinetic energies including intermediate storage by means of the rotation of the mass-receiving element 10 and the mass object 11 accommodated therein.

A time of rotation of the mass-receiving element 10 and the mass object 11 accommodated therein can vary in length depending on the type of a braking device provided and the option for the use of the kinetic energy. The reference sign $E_{ko}$ denotes kinetic energy of the vehicle before the crash. The reference signs $E_{kfo}$, $E_{kbo}$ and $\Delta E$ denote respective kinetic energy components after the triggering of the actuators, rammers, etc. The reference sign $T_K$ denotes a crash time for the residual vehicle when the body is at rest. The reference sign $T_{aB}$ denotes a battery run-down time until the mass object or respectively the battery comes to rest. The reference sign $Z_0$ denotes a crash beginning time. The reference sign Eabb denotes an energy reduction of the mass object 11. The reference sign Eabb1 denotes the uncontrolled reduction of the kinetic energy of the rotating mass-receiving element 10 and the mass object 11 accommodated therein by air and/or bearing friction. The reference sign Eabb2 denotes the controlled reduction of the kinetic energy of the mass-receiving element 10 and the mass object 11 accommodated therein by a combination of pneumatic and mechanical braking.

Although the present invention was described above with the aid of preferred exemplary embodiments, said invention is not limited to these but can be modified in a variety of ways. The invention particularly can be changed or modified in multiple ways without deviating from the gist of the invention.

For instance if a braking device 26 is provided, provision can be made for a connection to a possibly present cold gas generator in order to provide a relatively fast deceleration with the counter gas flow. The gas connection can be directly integrated into a cooling system of the motor vehicle. The incident flow with the gas occurs against the rotational direction of the mass object. Alternatively, a partial conversion of the kinetic energy of the rotation of the mass object can also directly or indirectly result in an acoustic signal, for example by means of a siren, which is designed to emit a warning signal relating to the accident. The sound can be generated using various methods, for example mechanically by means of a suitable structure on the interior wall of the housing, pneumatically or mechanically.

The invention claimed is:

1. A mass-decoupling device for a motor vehicle, the device comprising:
    a mass-receiving element (10) and a mass object (11) accommodated therein, the mass-receiving element (10) and the mass object (11) being point symmetrically formed and mounted opposite a body (12) of the motor vehicle;
    at least one guide means (13) that movably mounts the mass-receiving element (10) and the mass object (11) accommodated therein along a longitudinal axis (L) of the vehicle;
    decoupling means (14) configured to decouple the mass-receiving element (10) and the mass object (11) accommodated therein from the body (12) of the motor vehicle;
    first energy-receiving means (15) configured to transmit kinetic energy of a movement of the mass-receiving element (10) and the mass object (11) accommodated therein to the body (12) of the motor vehicle in a predetermined time interval, said movement occurring along the longitudinal axis (L) of the vehicle from a first position (P1) to a second position (P2); and
    second energy-receiving means (16) configured to convert, at least partially, the kinetic energy of the movement of the mass-receiving element (10) and the mass object (11) accommodated therein along the longitudinal axis (L) of the vehicle into kinetic energy of a rotation of the mass object (11),
    characterized in that the mass object (11) has a driver (18) in a peripheral region, which driver is configured in such a way that said driver (18) interacts with the second energy-receiving means (16), when a movement of the mass-receiving element (10) and the mass object (11) accommodated therein occurs along the longitudinal axis (L) of the vehicle, such that the mass object (11) can be set in rotation by the second energy-receiving means (16).

2. The mass-decoupling according to claim 1, characterized in that the first energy-receiving means (15) have at least one damping arrangement (17) configured to dampen the movement of the mass-receiving element (10) along the longitudinal axis (L) of the vehicle, wherein the at least one damping arrangement (17) has a first eddy-current actuator (45, 46).

3. The mass-decoupling device according to claim 1, characterized in that the second energy-receiving means (16) have a rammer (20) which is connected to a bumper (19) in an articulated manner and which interacts with the driver (18) formed on the mass-receiving element (10) such that the mass-receiving element (10) can be set in rotation by the rammer (20) when a movement of the mass-receiving element (10) and the mass object (11) accommodated therein occurs along the longitudinal axis (L) of the vehicle, the second energy-receiving means (16) comprising a return spring (21), which connects a distal end of the rammer (20) to the bumper (19), wherein the driver (18) engages with the rammer (20) in the first position (P1) of the mass-receiving element (10) and wherein the second energy-receiving means (16) are configured to return the rammer (20) to a hollow space (22) formed in the bumper (19) after the mass-receiving element (10) has be set in rotation.

4. The mass-decoupling device according to claim 1, characterized in that a discharge of kinetic rotational energy of the mass-receiving element (10) set in rotation and the mass object (11) accommodated therein can be reduced by air friction and/or a bearing friction of at least one bearing (25a, 25b) of the mass-receiving element (10).

5. A mass-decoupling device for a motor vehicle, the device comprising:
    a mass-receiving element (10) and a mass object (11) accommodated therein, the mass-receiving element (10) and the mass object (11) being point symmetrically formed and mounted opposite a body (12) of the motor vehicle;
    at least one guide means (13) that movably mounts the mass-receiving element (10) and the mass object (11) accommodated therein along a longitudinal axis (L) of the vehicle;
    decoupling means (14) configured to decouple the mass-receiving element (10) and the mass object (11) accommodated therein from the body (12) of the motor vehicle;

first energy-receiving means (15) configured to transmit kinetic energy of a movement of the mass-receiving element (10) and the mass object (11) accommodated therein to the body (12) of the motor vehicle in a predetermined time interval, said movement occurring along the longitudinal axis (L) of the vehicle from a first position (P1) to a second position (P2); and second energy-receiving means (16) configured to convert, at least partially, the kinetic energy of the movement of the mass-receiving element (10) and the mass object (11) accommodated therein along the longitudinal axis (L) of the vehicle into kinetic energy of a rotation of the mass object (11), characterized in that the decoupling means (14) have at least one clamping device (23) for coupling and/or decoupling the mass-receiving element (10) to/from the body (12) of the motor vehicle and at least one eddy-current actuator, the at least one eddy-current actuator being configured to operate the clamping device (23) for coupling and/or decoupling the mass-receiving element (10) to/from the body (12) of the motor vehicle.

6. The mass-decoupling device according to claim 5, characterized in that the clamping device (23) for coupling and/or decoupling the mass-receiving element (10) to/from the body (12) of the motor vehicle is disposed in an axis of rotation (R) of the mass receiving element (10) and the mass object (11) accommodated therein.

7. A mass-decoupling device for a motor vehicle, the device comprising:
a mass-receiving element (10) and a mass object (11) accommodated therein, the mass-receiving element (10) and the mass object (11) being point symmetrically formed and mounted opposite a body (12) of the motor vehicle;

at least one guide means (13) that movably mounts the mass-receiving element (10) and the mass object (11) accommodated therein along a longitudinal axis (L) of the vehicle;

decoupling means (14) configured to decouple the mass-receiving element (10) and the mass object (11) accommodated therein from the body (12) of the motor vehicle;

first energy-receiving means (15) configured to transmit kinetic energy of a movement of the mass-receiving element (10) and the mass object (11) accommodated therein to the body (12) of the motor vehicle in a predetermined time interval, said movement occurring along the longitudinal axis (L) of the vehicle from a first position (P1) to a second position (P2), and second energy-receiving means (16) configured to convert, at least partially, the kinetic energy of the movement of the mass-receiving element (10) and the mass object (11) accommodated therein along the longitudinal axis (L) of the vehicle into kinetic energy of a rotation of the mass object (11), characterized in that the discharge of kinetic rotational energy of the mass-receiving element (10) set in rotation and the mass object (11) accommodated therein can be reduced by a brake assembly (26) for decelerating the mass-receiving element (10) and the mass object (11) accommodated therein.

8. The mass-decoupling device according to claim 7, characterized in that the brake assembly (26) for decelerating the mass-receiving element (10) and the mass object (11) accommodated therein comprises a plurality of planarly configured mechanical brake elements (28a, 28b, 28c, 28d, 28e, 28f, 28g), wherein a pneumatic brake element (27) is configured to interact with the plurality of mechanical brake elements (28a, 28b, 28c, 28d, 28e, 28f, 28g) by supplying an air flow into a channel (31) formed between an outer peripheral section (29) of the mass object (11) and an inner peripheral section (33) of a housing of the brake assembly (26) such that air flowing through the channel (31) causes a deceleration pulse for decelerating the mass-receiving element (10) and the mass object (11) accommodated therein when said air is incident on the plurality of planarly configured mechanical brake elements (28a, 28b, 28c, 28d, 28e, 28f, 28g), and wherein a spring force ($F_{FE}$) of a spring element (32a, 32b, 32c, 32d, 32e, 32f, 32g) is applied to each of the plurality of mechanical brake elements (28a, 28b, 28c, 28d, 28e, 28f, 28g), which causes a mechanical deceleration of the mass element by means of frictional contact of the plurality of mechanical brake elements (28a, 28b, 28c, 28d, 28e, 28f, 28g) with an inner peripheral surface (33) of the housing of the brake assembly (26) when a spring force ($F_{FE}$) is applied which is larger than a centrifugal force ($F_{FK}$) generated by the rotation of the mass-receiving element (10) and the mass object (11) accommodated therein.

9. A method for decoupling mass for a motor vehicle, comprising the following steps:
decoupling (S1), from a body (12) of the motor vehicle, a mass-receiving element (10) and a mass object (11) accommodated therein, wherein the mass-receiving element (10) and the mass object (11) are point symmetrically formed and mounted opposite the body (12) of the motor vehicle;

transmitting (S2) kinetic energy of a movement of the mass-receiving element (10) and the mass object (11) accommodated therein to the body (12) of the motor vehicle in a predetermined time period by means of first energy-receiving means (15), said movement occurring along a longitudinal axis of the vehicle from a first position (P1) to a second position (P2) of the mass-receiving element (10) and the mass object (11) accommodated therein, wherein said mass-receiving element (10) and said mass object (11) accommodated therein are movably mounted along the longitudinal axis (L) of the vehicle by means of at least one guide means (13); and converting (S3), at least partially, the kinetic energy of the movement of the mass-receiving element (10) and the mass object (11) accommodated therein along the longitudinal axis (L) of the vehicle into kinetic energy of a rotation of the mass object (11) by means of second energy-receiving means (16), wherein, when a movement of the mass-receiving element (10) and the mass object (11) accommodated therein occurs along the longitudinal axis (L) of the vehicle, a driver (18) in a peripheral region of the mass object (11) interacts with the second energy-receiving means (16) such that the mass object (11) is set in rotation by the second energy-receiving means (16).

* * * * *